United States Patent [19]

Krebs et al.

[11] 3,923,656

[45] Dec. 2, 1975

[54] PACKAGE AEROBIC WASTE TREATMENT SYSTEM

[75] Inventors: J. Robert Krebs; Thomas G. Abele, both of Dayton, Ohio

[73] Assignee: Multi-Flo, Inc., Dayton, Ohio

[22] Filed: Dec. 17, 1973

[21] Appl. No.: 425,556

[52] U.S. Cl. ................. 210/86; 210/151; 210/170; 210/203; 210/218; 210/220
[51] Int. Cl.² ..................... B01D 33/00; C02C 1/04
[58] Field of Search ............ 210/11, 15, 17, 86, 90, 210/93, 150, 151, 170, 195, 199, 203, 205, 218, 220, 221, 311, 323, 237, 300, 301

[56] References Cited
UNITED STATES PATENTS

| | | | |
|---|---|---|---|
| 1,271,925 | 7/1918 | Moore | 210/237 |
| 3,210,053 | 10/1965 | Boester | 210/17 X |
| 3,407,572 | 10/1968 | Tolley | 210/323 X |
| 3,440,669 | 4/1969 | Boester | 210/220 X |
| 3,487,015 | 12/1969 | Boester | 210/15 X |
| 3,543,294 | 11/1970 | Boester | 210/220 X |
| 3,547,811 | 12/1970 | McWhirter | 210/15 X |
| 3,615,016 | 10/1971 | Soriente et al. | 210/323 X |
| 3,679,053 | 7/1972 | Koulovatos et al. | 210/86 |
| 3,680,704 | 8/1972 | Schaefer | 210/218 |
| 3,681,236 | 8/1972 | Bergles et al. | 210/195 X |
| 3,807,565 | 4/1974 | Langston et al. | 210/220 X |

Primary Examiner—Charles N. Hart
Assistant Examiner—Robert H. Spitzer
Attorney, Agent, or Firm—Biebel, French & Bugg

[57] ABSTRACT

A package sewage treatment system which operates on an aerobic treatment basis and is particularly adapted for use with residential dwellings. The system includes a main holding tank to which is attached a hemispherical domed cover which contains a perforated hanger plate and an inner, cylindrical surge chamber. An aeration pump mounted at the bottom of the main holding tank aspirates air throughout the system and provides the necessary conditions for aerobic bacterial life. Liquid leaving the system passes through a plurality of porous bags which are mounted on the hanger plate and extend down into the main holding tank. Each of the bags is provided with an internal support to resist collapsing of the bags during hydraulic pressure surges and an alarm system is provided to detect loss of air supply to the system, abnormal increases of solids level in the system and the necessity for cleaning the porous filter bags.

20 Claims, 8 Drawing Figures

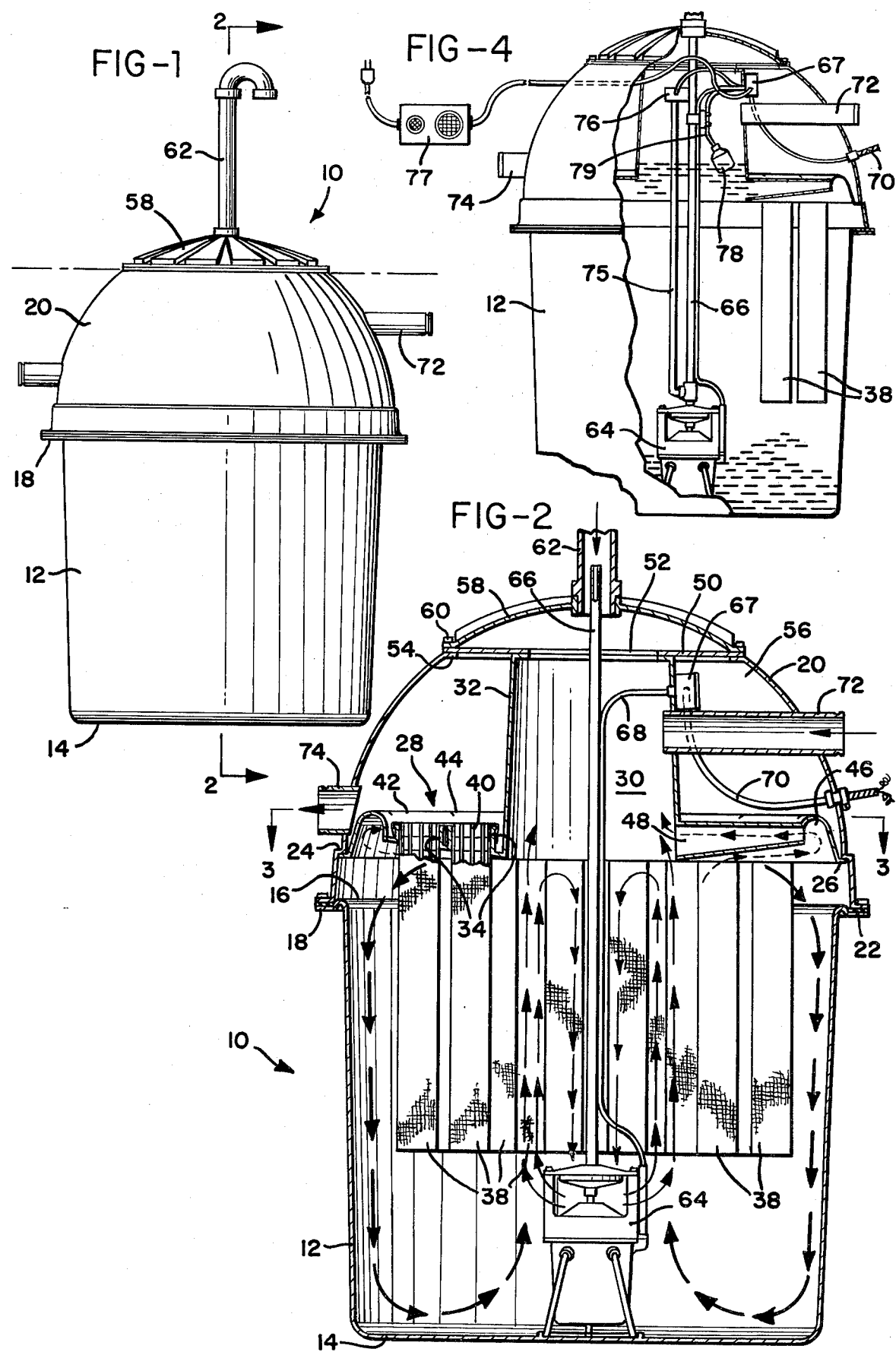

U.S. Patent  Dec. 2, 1975  Sheet 2 of 2  3,923,656
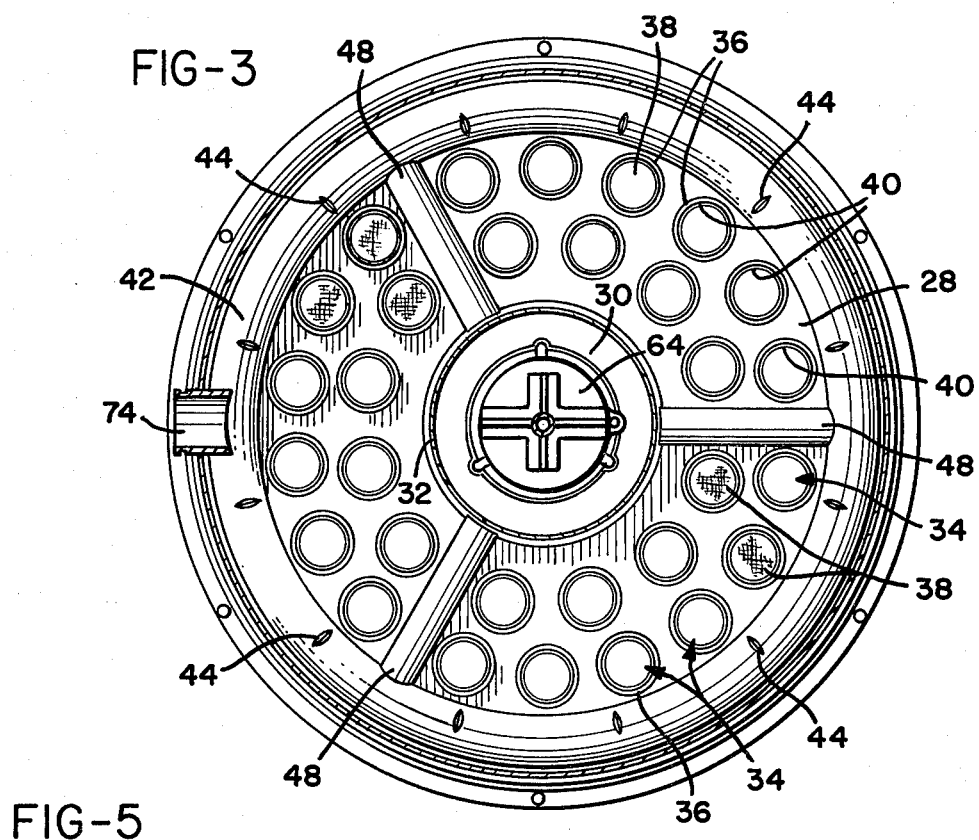
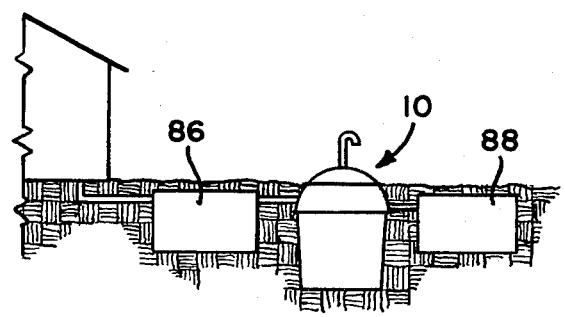
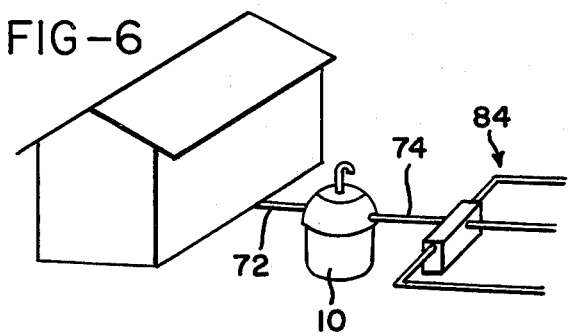
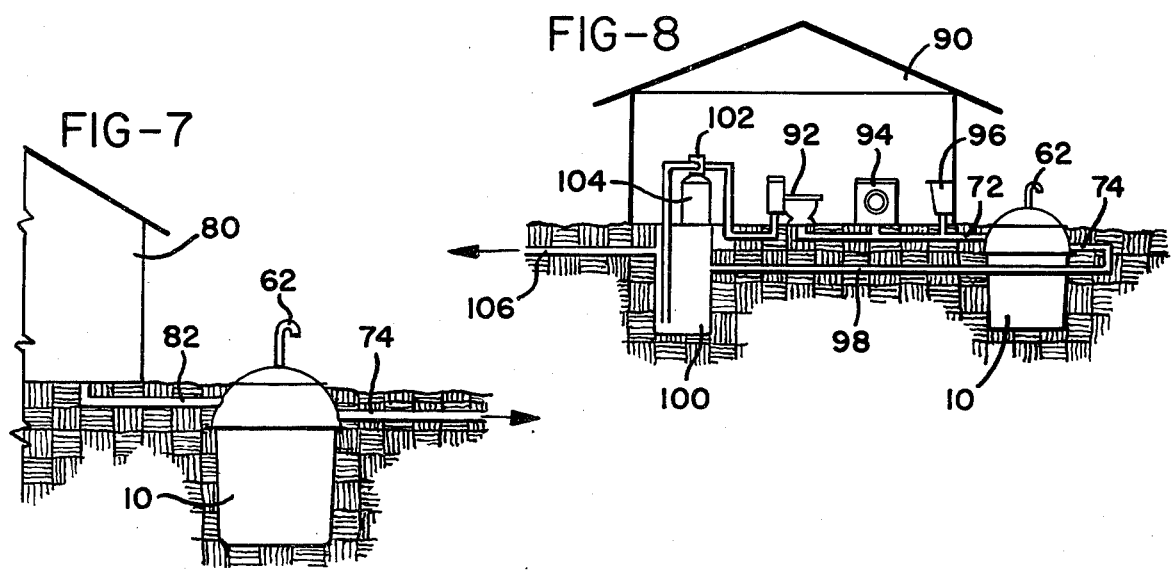

PACKAGE AEROBIC WASTE TREATMENT SYSTEM

BACKGROUND OF THE INVENTION

The more conventional treatment of domestic sewage from individual residential units where, for example, municipal sewage systems are not available, is by means of septic systems. In a septic system waste material is treated by an anaerobic bacterial process which slowly decomposes the sewage into hydrogen sulfide gas, methane and water. Aside from the fact that such systems are relatively slow working, the gases resulting from the decomposition process have noxious odors and the methane gas is highly inflammable.

Additionally, the slow decomposition process associated with systems of this type will generally cause solids to accumulate in the system at a fairly high rate, since they are decomposed at a slower rate than they are deposited in the system. This results in the necessity of relatively frequent cleaning of the system. It will also be found that in some instances soil characteristics are such that the usual septic system cannot be used satisfactorily.

Another, less common type of sewage treatment system for single dwelling units is one that operates on an aerobic bacterial process. In this type of system waste materials are broken down into carbon dioxide and water. In addition to the fact that the aerobic process is much more rapid than the anaerobic process, the products of the process are not objectionable with regard to odor or flammability.

Examples of aerobic sewage treatment systems are disclosed in several U.S. Pat. Nos. to Boester, 3,051,315; 3,210,053; 3,440,669; 3,487,015; 3,543,294; as well as in earlier U.S. Pat. Nos. 2,141,979 and 2,188,162 and the later U.S. Pat. No. 3,577,678.

Despite the advantages of aerobic sewage treatment systems, the majority of residences requiring their own sewage treatment still rely upon septic systems. In addition to the fact that a septic system may be less expensive initially to install, the apparent preference for septic systems may be based to some extent upon the necessity of providing proper operating conditions to support the bacteria growth necessary to provide an aerobic decomposition of waste materials.

Although the maintenance of the necessary conditions to support aerobic bacteria activity may present no more than routine problems for a commercial or municipal sewage treatment plant, such systems must necessarily be relatively maintenance free and simple to operate in order to obtain acceptance on a wide scale basis for domestic, as opposed to commercial or municipal use.

Additionally, previous systems of this type have incorporated individual filter systems or small area filter systems which do not provide for adequate length of time between cleanings or take into consideration surge conditions that occur during normal operating conditions.

SUMMARY OF THE INVENTION

The present invention provides an aerobic package sewage treatment system particularly adapted for domestic use which is compact in configuration and relatively easy to install and operate, and thus is especially adapted for use in isolated locations where service and maintenance are not readily available. To assist in maintaining and servicing, an alarm system senses air pressure in the line, the level in the system and the solids loading in the system. The alarm system sounds a horn which may be silenced and a light which remains lit until the condition noted has been corrected.

In accordance with the present invention a main holding tank is provided in which are suspended a plurality of porous bags which not only serve as filters but also provide a habitat for aerobic bacterial colonies and function as conduits for the final effluent as it passes from the holding tank. Sewage is delivered to the holding tank through a surge chamber positioned above the holding tank and an aerator mounted near the bottom of the holding tank draws air into the system to provide oxygen and produce an environment conducive to the propogation of aerobic bacteria while also ensuring a positive circulation within the holding tank.

The porous bags are suspended from a hanger plate which is mounted on and extends across the open mouth of the holding tank, and the surge chamber, which is preferably formed integrally with the hanger plate, extends upwardly from the hanger plate and communicates with the holding tank through an opening formed in the hanger plate. The hanger plate slopes upwardly and outwardly away from the surge chamber and, outwardly of the open mouths of the bags supported by the hanger plate, defines a weir.

The holding tank and surge chamber may be of circular cylindrical configuration and the hanger plate and weir similarly shaped, although it will be apparent that non-circular, cylindrical shapes, such as polygonal, may be used for the holding tank and surge chamber and the hanger plate and weir shaped accordingly.

In any case, the effluent resulting from the aerobic decomposition of the waste material passes through the walls of the porous bags and flows upwardly within the bags into an effluent chamber defined by the hanger plate upper surface, the outer wall of the surge chamber, and a dome shaped cover. The effluent then passes over the weir and out of a discharge outlet communicating with the effluent chamber.

Preferably the porous bags are formed of a non-corroding and nondeteriorating material such as a synthetic material, and serve not only to remove all solids from the treated material, but also accommodate bacterial life on their outer surfaces to further promote biological degradation of waste material.

The porous bags are provided with internal supports to prevent collapsing of the bags and permit continuous use of their full surface area under conditions of hydraulic surging that may occur during normal system usage, and the bags are easily removed from the hanger plate for replacement or cleaning.

While the system is provided with an access cover to permit entry to the system for maintenance and removal of components, such as the filter bags for cleaning, cleaning may also be accomplished by backflushing the system.

Within the holding chamber air drawn into the system by the aerator flows upwardly and outwardly, providing a positive circulation, which not only tends to comminute solid particles but also assures efficient dispersion of the oxygen throughout the holding tank to promote the aerobic bacterial process.

The under surface of the hanger plate beneath the weir serves as a collection chamber for gas rising upwardly within the holding tank, and a series of radially disposed ducts interconnect the annular collection chamber and the surge chamber. The surge chamber in turn communicates with a vent formed through the domed cover of the system. The vent line is formed of sufficiently larger diameter than the air intake line for the aerator to allow the intake line to extend into the vent.

The sewage treatment system of the present invention thus provides a compact modular system for treating sewage and other waste materials by an aerobic process at a highly efficient rate and with relatively little maintenance.

BRIEF DESCRIPTION OF THE DRAWINGS

FIG. 1 is an elevational view of a system in accordance with the present invention;

FIG. 2 is a cross sectional view taken on line 2—2 of FIG. 1;

FIG. 3 is a cross sectional view taken on line 3—3 of FIG. 2;

FIG. 4 is a view similar to FIG. 2, but showing an alarm system that may be incorporated in the system; and FIGS. 5 through 8 are schematic representations of various installations utilizing the system of the present invention.

DESCRIPTION OF THE PREFERRED EMBODIMENTS

With reference to FIGS. 1 through 3 of the drawings, it will be seen that a sewage treatment system 10 of the present invention includes a holding tank 12 which may be of cylindrical configuration, although it will be apparent that a polygonal cross sectional configuration may also be utilized.

In any case the holding tank 12 has a closed lower end 14 and an open upper end 16. An outwardly turned lip 18 on the holding tank supports a dome shaped cover 20 with gasket material 22 interposed between cover 20 and tank 12. The lower edge of the cover 20 is offset, as at 24, and an outwardly projecting flange 26 of a hanger plate 28 is attached thereto by any convenient means, such as an adhesive.

Hanger plate 28 is of annular configuration, having a central opening 30 therethrough. A cylindrical surge chamber 32 is formed integrally with plate 28, extends upwardly therefrom, and communicates with the interior of the holding tank 12 through the opening 30.

The hanger plate is also provided with a plurality of relatively small diameter openings 34, each of which is surrounded by a collar 36 projecting upwardly therefrom. Porous bags 38 having closed lower ends are inserted through the openings 34 and their upper ends cuffed over the collar 36 and secured thereon by any suitable fastening means such as wire ties.

A skeletal framework 40 of, for example, relatively open mesh wire, is received in each bag 38 and supports the bag against collapsing under pressure which may result from hydraulic surges in the system. Preferably each bag 38 is also weighted by depositing a quantity of clean gravel or the like in the bottom of each bag.

The hanger plate slopes upwardly and outwardly from the surge chamber 32 and an annular weir 42 is formed on an upper surface of the hanger plate. At spaced positions around the weir notches 44 are provided for a purpose to be explained below. At that portion of the under surface of the hanger plate beneath the weir 42 an annular gas collecting chamber 46 is formed, communicating with the surge chamber 32 by means of radially extending ducts 48.

An inner cover 50 having an opening 52 therethrough is mounted on the flange 54 of the cover 20 and defines, with the cover 20, the upper surface of the hanger plate 28 and the outer wall of the surge chamber 32, an effluent chamber 56. A domed access cover 58 is mounted on the inner cover 50 and may be bolted thereto as at 60, and a vent pipe 62 of relatively large diameter extends upwardly through the access cover.

Mounted in the holding tank 12 and supported by the closed lower end 14 thereof is an aerator 64. Any suitable aerator may be utilized for this purpose such as the Model Sa-06-11 Submersible Aerator manufactured by Multi-Flo, Inc. The aerator is connected to an air intake line 66 which is of relatively small diameter as compared to the vent line 62 and may extend upwardly therein.

To provide power for the aerator 64 an electrical connection box 67 may be mounted on the exterior wall of the surge chamber 62 and interconnect a line 68 leading to the aerator and a line 70 connected to a suitable source of electrical power. An inlet pipe 72 extends through the cover 20 and the surge chamber 32 while an outlet 74 communicates with the effluent chamber 56 through the wall of the cover 20.

In operation, the unit 10 will be filled to the level of the weir 42. Sewage entering the system through the conduit 72 passes into the surge chamber 32 and thence downwardly into the holding tank 12. The aerator 64 draws air into the system which provides oxygen for the aerobic decomposition process and sets up a positive circulation in the system as indicated by the arrows in FIG. 2 of the drawings.

The capacity of the holding tank allows waste material received therein to be acted upon by aerobic bacterial action, breaking the solids down into carbon dioxide and water. When the material in the holding tank is displaced by an incoming charge of sewage, liquid in the holding tank is forced through the porous bags 38 and upwardly into the effluent chamber 56. In this regard the porous bags 38 also serve as a habitat for aerobic bacteria, which provide a final treatment of the material before it filters into the interior of the filter bags, and as conduits for the effluent from the holding tank to the effluent chamber.

The effluent then flows outwardly, with scum being retained by the weir 42 while the relatively clear effluent passes over the weir through the notches 44 and thence out of the effluent chamber through the outlet 74. During the operation of the system, air drawn in by the aerator 64 is directed outwardly and upwardly, as indicated by the light arrows in FIG. 2.

A portion of the air is then returned in a downward flow path about the air intake line, while some escapes upwardly through the surge chamber and vent line. There is also an outward flow beneath the hanger plate into the collecting ring 46. Return ducts 48 allow gas collected in the annular collecting ring 46 to pass radially inwardly into the surge chamber 32, where a portion of the gases pass back down into the holding tank while any excess gas can escape through the surge chamber 32 and vent pipe 62.

It will also be seen that this flow sets up hydraulic currents, indicated by the heavy arrows in FIG. 2, which scour the side walls and bottom corners of the holding tank and provide an inflow of liquid to the aerator 64.

As noted above the system of the present invention may also incorporate an alarm system to detect abnormal conditions within the system. Such conditions would occur where, for example, the flow of air to the aerator 64 is for some reason interrupted, the solids build up in the holding tank 12 becomes excessive or the bags 38 become clogged to the point where the system is operating inefficiently.

Thus, as seen in FIG. 4 of the drawings, a tube 75 may be attached to the lower end of the intake pipe 66 by means of a T-fitting or the like. The tube 75 communicates at its upper end with a pressure switch 76, which seals off the upper end of the tube 75. During normal operation the intake line 66 and the tube 75 will be evacuated of water as air is drawn through the intake pipe to the aerator 64.

However, should the aerator cease to function, for whatever reason, the intake line 66 will fill with liquid up to the level of the liquid in the system and some liquid will rise in the tube 75, actuating the pressure switch 76 and sounding an alarm 77, which, as indicated somewhat diagrammatically in FIG. 4, is connected through the connection box 67 with the pressure switch 76.

In a typical installation the alarm 77 will be positioned in the dwelling with which the system 10 is associated and will be provided with a plug for the usual household outlet. The alarm may be of the type that includes a horn or other audible signal which sounds upon the occurence of a malfunction, but which may be silenced, and a light which remains on until the malfunction is corrected.

It will also be seen in FIG. 4 that an alarm system may be incorporated for monitoring an abnormal rise in the level of the contents in the system, which rise would indicate either an over accumulation of solids in the system or that the porous bags 38 are becoming plugged. Thus, it will be seen that a float 78 is positioned within the surge chamber 32 and has a line 79 leading therefrom to the electrical connection box 67. The length of the line 79 is selected with respect to the normal liquid level in the system, such that the line is taut when the level is at the desired height. The float 78 is weighted at a point adjacent its connection to the line 79 and contains a switch, such as a mercury switch, so that if the level of material within the system rises appreciably above the desired level the float will tend to tip downwardly, closing the mercury switch contained therein and again, actuating the alarm 77.

Regardless of whether an alarm as described above is utilized, a number of applications of the system are possible. Illustrative applications are described below, although many variations thereof will be apparent. Turning first to FIG. 7 of the drawings, the simplest application would be with the system 10 used in conjunction with a dwelling unit 80. Thus, the outlet 82 from the dwelling 80 will be connected to the inlet 72 of the system and outlet 74 of the system would then discharge to any convenient source. In this regard the effluent from line 74 could be treated by chlorination or another similar process if desired.

In some situations where an existing septic tank has deteriorated to the point of requiring replacement, a unit 10 may be utilized as seen in FIG. 6 of the drawings, with the discharge from the line 74 feeding into the existing tile field 84 of the previous septic system.

Where the septic tank itself has not deteriorated, but for some reason has proven inadequate, the unit 10 may be installed, as shown in FIG. 5, intermediate the existing septic tank 86 and the tile field 88 thereof.

A further application of the system is shown somewhat diagrammatically in FIG. 8 of the drawings. Thus, the dwelling 90 is shown as directing all waste material to a system 10 through the inlet 72 thereof. The units shown for purposes of illustration as discharging into the system are a water closet 92, a washer 94 and a sink 96 although, of course, in most instances there will be other units as well.

The effluent from the discharge line 74 is recycled through the line 98 to a recycled water storage chamber 100, from whence it is drawn by a pump 102 mounted on a storage tank 104 and recycled into the water closet 92. Overflow line 106 permits excess recycled water to be discharged from the system with or without chlorination or other treatment as required.

Regardless of the particular application in which the sewage treatment system of the present invention is utilized, it will be seen that the present invention provides a compact package sewage treatment system for treating waste material by an aerobic treatment process.

While the forms of apparatus herein described constitute preferred embodiments of the invention, it is to be understood that the invention is not limited to these precise forms of apparatus, and that changes may be made therein without departing from the scope of the invention.

What is claimed is:
1. A waste treatment system comprising:
   a. a holding tank adapted to receive predominantly liquid waste material,
   b. a plurality of open mouth porous bags suspended in said holding tank and adapted to be submerged in waste material held therein,
   c. means defining an effluent chamber separate from said holding tank and in communication with the interior of said open mouth bags,
   d. inlet means for delivering waste material into said holding tank,
   e. outlet means for removing effluent from said effluent chamber,
   f. aerating means for delivering oxygen to said holding tank to promote aerobic bacterial action in said holding tank and on outer surfaces of said bags, and
   g. means defining a weir in said effluent chamber intermediate said open mouths of said bags and said outlet means.
2. The system of claim 1 further comprising:
   a. gas collecting means in said holding tank, and
   b. means for venting gas collected in said collecting means from said system.
3. The system of claim 2 further comprising:
   a. duct means communicating with said collecting means and said venting means.
4. The system of claim 1 further comprising:
   a. a surge chamber positioned above said holding tank and partially defining said effluent chamber.
5. The system of claim 4 wherein:
   a. said surge chamber is in direct communication with said holding tank.
6. The system of claim 5 wherein:
   a. said inlet means is in communication with said surge chamber.
7. The system of claim 1 further comprising:

a. a cover extending upwardly from said holding tank and partially defining said effluent chamber,
b. vent means formed in said cover, and
c. an air line extending from said air means through said vent means.

8. The system of claim 1 further comprising:
a. means for detecting a discontinuance of delivery of oxygen by said aerating means to said holding tank.

9. The system of claim 1 wherein:
a. said aerating means comprises an air intake line extending into said holding tank and means for drawing air through said intake line into said holding tank,
b. a tube is provided in communication with said intake line adjacent lower ends of said line and said tube,
c. a pressure switch is mounted on an upper end of said tube, and
d. an alarm means is provided responsive to actuation of said pressure switch.

10. The system of claim 1 further comprising:
a. means for detecting a rise in the level of the contents of said holding tank above a desired level.

11. The system of claim 1 further comprising:
a. float mounted switch means adapted to float on the surface of the contents of said holding tank, and
b. alarm means responsive to said float mounted switch means when the level of the contents of said holding tank rises above a desired level.

12. A waste treatment system comprising:
a. a holding tank adapted to receive predominantly liquid waste material,
b. a plurality of open mouth porous bags suspended in said holding tank and adapted to be submerged in waste material held therein,
c. means defining an effluent chamber separate from said holding tank and in communication with the interior of said open mouth bags,
d. inlet means for delivering waste material into said holding tank,
e. outlet means for removing effluent from said effluent chamber,
f. aerating means for delivering oxygen to said holding tank to promote aerobic bacterial action in said holding tank and on outer surfaces of said bags,
g. a hanger plate extending across said holding tank and separating said holding tank and effluent chamber,
h. said hanger plate sloping upwardly to form a weir intermediate open mouths of said bags and said outlet means, and
i. means suspending said bags from said hanger plate.

13. The system of claim 12 further comprising:
a. gas collecting means defined by a portion of a lower surface of said hanger plate beneath said weir.

14. The system of claim 13 further comprising:
a. a surge chamber extending upwardly above said hanger plate and communicating with said holding tank through said hanger plate.

15. The system of claim 14 further comprising:
a. duct means communicating with said surge chamber and said gas collecting means.

16. A waste treatment system comprising:
a. a holding tank adapted to receive predominantly liquid waste material,
b. a plurality of open mouth porous bags suspended in said holding tank and adapted to be submerged in waste material held therein,
c. means defining an effluent chamber separate from said holding tank and in communication with the interior of said open mouth bags,
d. inlet means for delivering waste material into said holding tank,
e. outlet means for removing effluent from said effluent chamber,
f. aerating means for delivering oxygen to said holding tank to promote aerobic bacterial action in said holding tank and on outer surfaces of said bags,
g. a hanger plate extending across said holding tank and separating said holding tank and effluent chamber,
h. means suspending said bags from said hanger plate, and
i. a surge chamber extending upwardly from said hanger plate and communicating with said holding tank through said hanger plate.

17. The system of claim 16 wherein:
a. said holding tank is substantially cylindrical in configuration, and
b. said hanger plate is of substantially annular configuration.

18. The system of claim 16 wherein:
a. said inlet means communicates with said surge chamber.

19. The system of claim 18 further comprising:
a. gas collecting means extending annularly beneath said hanger plate, and
b. radially disposed ducts interconnecting said gas collecting means and said surge chamber.

20. A waste treatment system comprising:
a. a substantially cylindrical holding tank having an open upper end and a closed lower end,
b. a hanger plate extending across said open upper end of said holding tank,
c. a large diameter opening substantially centrally located in said hanger plate,
d. a cylindrical surge chamber having open upper and lower ends,
e. said surge chamber being mounted on said hanger plate with said open lower end thereof coincident with said large diameter opening in said hanger plate,
f. said hanger plate sloping upwardly and outwardly radially thereof from said large diameter opening and defining an annular weir on an upper surface of said hanger plate adjacent but spaced inwardly from an outer periphery thereof,
g. a lower surface of said hanger plate beneath said weir defining an annular collection ring,
h. a plurality of return ducts formed in said hanger plate, extending radially inwardly from said collection ring to said surge chamber and placing said surge chamber and collection ring in communication with each other,
i. a plurality of small diameter openings formed through said hanger plate intermediate said large diameter opening and said weir,
j. a plurality of collars projecting upwardly from said hanger plate at said small diameter openings,
k. a plurality of porous open mouth bags,
l. said open mouth bags being attached to said collars and extending through said small diameter openings into said holding tank, m. a substantially dome shaped cover extending across said holding chamber above said hanger plate and said surge chamber and defining therewith an effluent chamber,
n. an outlet conduit extending through said cover and communicating with said effluent chamber,
o. an inlet conduit extending through said cover and said surge chamber and communicating with said surge chamber,
p. a relatively large diameter vent pipe mounted on said dome shaped cover at the apex thereof,
q. an aerator positioned in said holding tank adjacent said lower end thereof,
r. a small diameter air intake pipe extending from said aerator into said vent pipe,
s. means for energizing said aerator to draw air into said holding tank,
t. means for detecting when air is not being drawn through said intake pipe,
u. means for detecting a rise in the contents of said system above a desired level, and
v. alarm means responsive to either of said detecting means.

* * * * *